United States Patent [19]

Rifkin et al.

[11] 3,760,486

[45] Sept. 25, 1973

[54] INTEGRAL STORAGE CONTAINER, SHIPPING CARTON AND EXTRACTION/INSERTION MECHANISM FOR MULTI-CHIP CIRCUIT MODULES

[75] Inventors: Alfred A. Rifkin; Andrew M. Simon, both of Wappingers Falls, N.Y.

[73] Assignee: International Business Machines Corporation, Armonk, N.Y.

[22] Filed: Apr. 6, 1970

[21] Appl. No.: 25,806

[52] U.S. Cl. ................. 29/278, 206/65 F, 294/1 R, 317/101 DH, 339/17 LM, 339/45 M, 339/110 R

[51] Int. Cl. .............................................. H01r 13/54

[58] Field of Search .................. 29/203 H, 206, 267, 29/268, 278, 270; 211/41; 294/1, 15; 317/101; 339/17, 18, 36, 65, 66, 75, 91, 176, 119, 125, 45, 58, 110, 108; 206/46 FC, 65 F

[56] References Cited

UNITED STATES PATENTS

| | | | |
|---|---|---|---|
| 3,267,565 | 8/1966 | Stuhler | 29/206 |
| 3,407,925 | 10/1968 | Ruchlemann | 206/65 F |
| 3,488,622 | 1/1970 | Gley | 339/75 M |
| 3,210,836 | 10/1965 | Johanson et al. | 29/278 |
| 2,853,772 | 9/1958 | Yuter | 29/278 |
| 3,137,065 | 6/1964 | Harris | 29/278 |
| 2,893,777 | 7/1959 | O'Neill et al. | 339/110 R |
| 3,177,406 | 4/1965 | Bernstein | 339/17 CF X |

FOREIGN PATENTS OR APPLICATIONS

| | | | |
|---|---|---|---|
| 837,380 | 6/1960 | Great Britain | 294/1 R |

*Primary Examiner*—Joseph H. McGlynn
*Assistant Examiner*—Terrell P. Lewis
*Attorney*—Hanifin and Jancin and Robert Lieber

[57] ABSTRACT

A storage case also useful as a shipping carton contains an integral actuator assembly for safely manipulating plug-in type circuit modules between a plug-in connection assembly and the storage compartment formed by the case. Fragile module components and other substructures are fully isolated from physical contact with surfaces of the case. The modules are transferred by relative manipulation of the case, actuator assembly and module. The case and actuator assembly form a plural pivot linkage for engaging and forcibly releasing a module from an in-service position in a plug-in connection within an electronic equipment frame. The actuator assembly is mounted for linear as well as pivotal displacement relative to the case so that a module can be unplugged and manipulated into an out-of-service/home position within the case with module substructures isolated from physical contact throughout such manipulation.

14 Claims, 8 Drawing Figures

INVENTORS
ALFRED A. RIFKIN
ANDREW M. SIMON

BY Robert Lieber

ATTORNEY

INTEGRAL STORAGE CONTAINER, SHIPPING CARTON AND EXTRACTION/INSERTION MECHANISM FOR MULTI-CHIP CIRCUIT MODULES

BACKGROUND OF THE INVENTION

1. Field of the Invention

The invention pertains to tools for inserting and extracting plug-in type circuit modules and to containers for protectively housing and storing such modules apart from electronic equipment frame assemblies in which they are normally housed. More specifically the invention pertains to a device comprising an integral extraction/insertion tool and protective case, and to an associated method and system, for handling plug-in circuit modules while maintaining delicate sub-structures or components of the modules totally isolated from physical contact.

2. Description of the Prior Art

Presently known extraction tools for plug-in circuit modules have limited utility for use upon highly integrated modules inasmuch as delicate sub-structures and components (e.g., integrated circuit chips, cooling studs, printed circuits, etc.) of the modules are exposed to physical contact after the modules are released from their plug-in connections. Consequently, out-of-service modules are subject to damage in handling; for example, in shipment between electronic equipment frames in the field and a remote repair or inventory facility.

This and related problems concerning security of module handling are addressed and eliminated by the present invention.

SUMMARY

Briefly, we have devised a method and apparatus for improving the handling of plug-in type circuit modules having components or sub-structures requiring protection whereby the sub-structures are totally isolated from physical contact as and when the modules are removed from in-service plug-in connections.

A feature of our invention is the provision of an integral device useful both as a storage/shipping container for out-of-service modules and an extraction/insertion tool. Together with engagement elements on the modules an actuator assembly portion of this device forms a plural pivot linkage adapted specifically for forcible extraction and protective handling of modules.

Subsidiary features include a number of specific constructional details of the integral container and tool device which are designed to: a) facilitate the application of substantial insertion/extraction forces to a module; and b) retain a module, after it has been drawn into home position within the storage compartment of a container device, so that the module is not likely to be accidentally released and dropped out of the container.

Details of the foregoing and other features of the present invention will be more fully appreciated upon consideration of the following description of particular embodiments thereof.

DETAILED DESCRIPTION OF PREFERRED EMBODIMENTS

Figure 1:
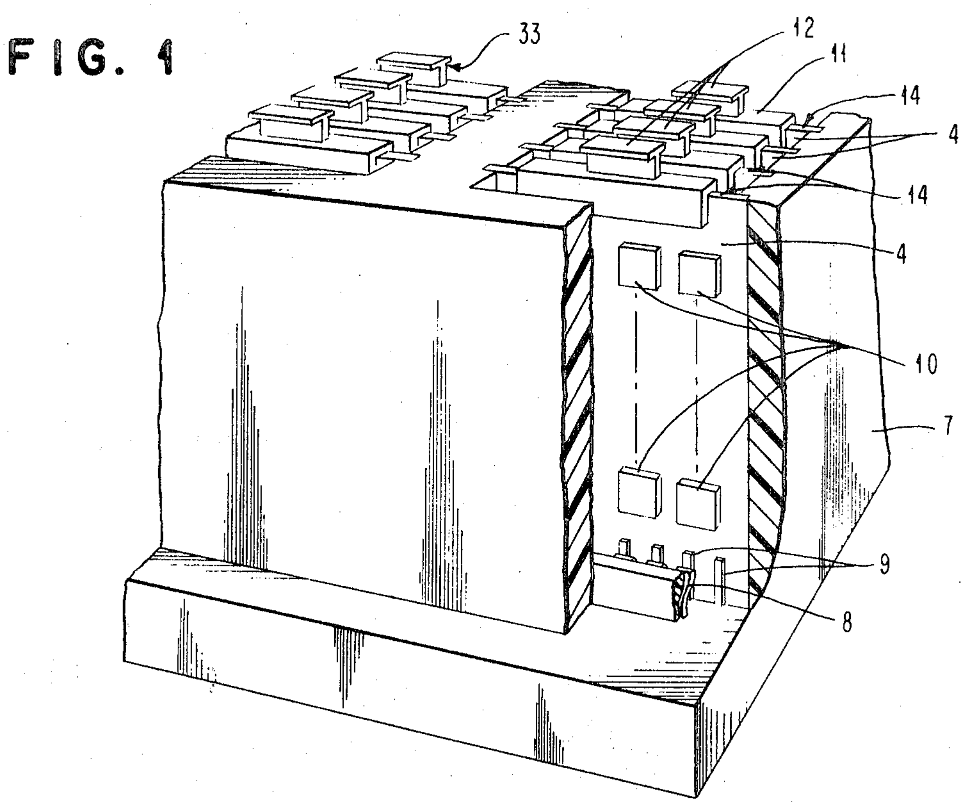
FIG. 1 is a perspective view of a portion of an electronic equipment assembly containing plug-in circuit modules adapted for handling in accordance with the present invention.
Figure 2:
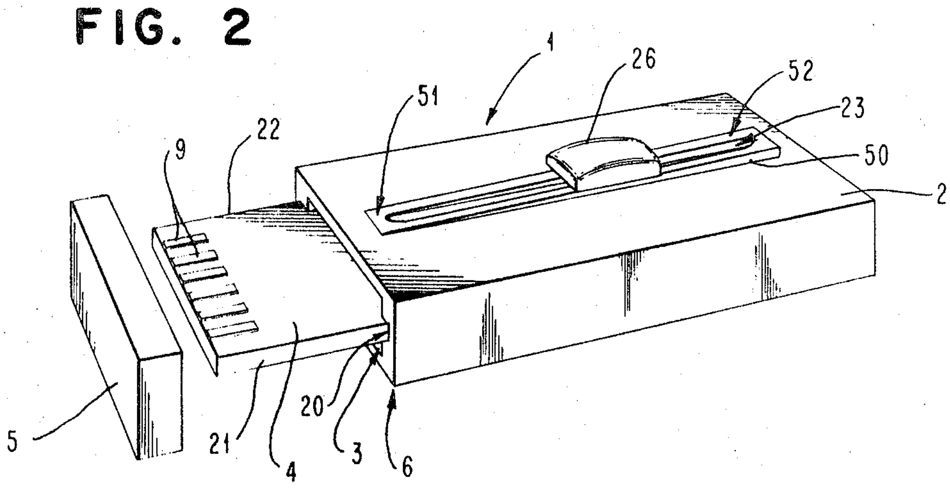
FIG. 2 is a perspective view of an integral case and manipulative tool as presently contemplated with a circuit module shown partially drawn up into the interior compartment of the case.

Referring to FIGS. 1 and 2 an integral storage case and extraction/insertion tool 1 according to the present invention comprises a molded plastic case 2. The case includes an opening 3 into which a plug-in circuit module 4 can be received. A molded plastic cover 5 fits snugly over the rim 6 of case 2 to form a closed container assembly. In active service modules 4 are mounted as shown in an electronic equipment frame 7 containing connector elements 8 which mate in plug-in engagement with corresponding terminal portions 9 of respective modules.

The present invention according to one aspect thereof seeks to secure forcible release of modules from such plug-in connections and withdrawal of released modules into home storage positions within storage compartments 3 in respective releasing devices 1 with sensitive module components or sub-structures 10 (e.g., integrated circuit chips, printed circuits, cooling studs, etc.,) effectively isolated from physical contact of any kind.

Cemented securely to each module is an engagement head member 11 with a stud-like extension or captivating bar 12 by which the module can be engaged for release from plug-in connection and for sliding manipulation into the case in a manner to be described later. Head members 11 have unitary construction. Suitable members have been made by extrusion of aluminum. However molded plastic should be equally suited to the purpose. The head unit is dimensioned to fit snugly over the upper edge 14 of the respective module and securely and permanently fastened thereto by a suitable bonding agent. For the aluminum extrusion epoxy cement may be used. Epon™931 product of Shell Chemical Co. has been used with excellent results. In general the bond strength must be sufficient to withstand the forces over the bond area which are anticipated in connection with unplugging of modules.

Figure 6:
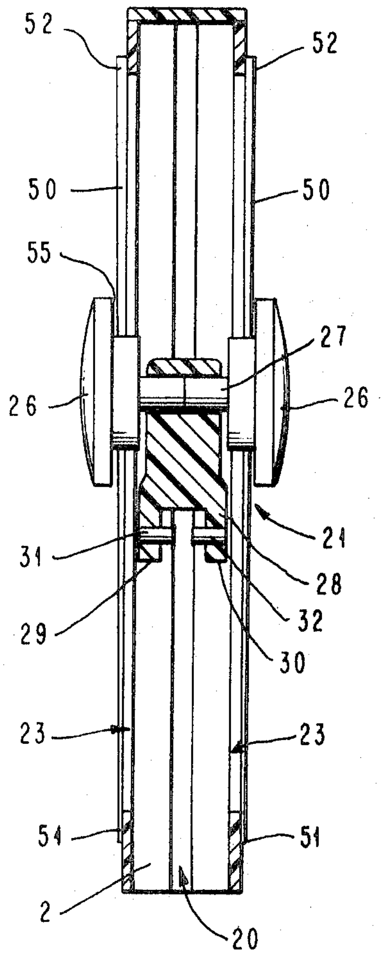
FIG. 6 is a side sectional view of the integral case device illustrating features of its construction.

Referring to FIGS. 2 and 6 integral extraction device and case 1 contains internal guide channels 20 adapted to receive edges 21, 22 of a module and to act as guide tracks for maneuvering the module centrally into the interior space of the case allowing for a predetermined clearance between substructures 10 and interior surfaces of the case.

The actuating assembly 21 which is used in forcibly deplugging and slidably manipulating a module into the interior of the case is mounted slidably in longitudinal grooves 23 provided on opposite faces of the case. Plastic knobs 26 extending outwardly of these grooves afford manual access to the assembly 21 for sliding the same along the grooves.

Knobs 26 are joined together by plastic dowel pin 27 which extends from one of the knobs and press-fits into an opening in the other. A linking member 28 is rotatably journalled on the dowel pin 27. Constructions 29 and 30 at the lower portion of member 28 form a yoke-like frame designed to fit over captivating bars 12 of modules 4 in the manner and for the purposes described later with reference to FIGS. 3–5. Member 28 is made of die-cast metal or molded plastic. Pins 31, 32 are embedded in an extend interiorly of constructions 29, 30 to form pivot elements for engaging under surfaces 33 (FIG. 1) of module captivating studs 12.

It can be appreciated that the assembly formed by knobs 26, dowel 27, member 28, and pins 31, 32 is translatably disposed in the grooves 23 of case 2, that link 28 pivots upon dowel 27 and that pins 31, 32 may slide and pivot relative to an engaged module captivating stud 12 in the absence of other restraints.

To extract a module (FIGS. 3–5) from a plug-in connection case 2 is placed over the module with the actuator assembly fully extended towards the opening 3. Pins 31, 32 are engaged beneath the captivating stud 12 of the module by sliding yoke 29, 30 over and across the stud.

Figures 3, 4, 5:
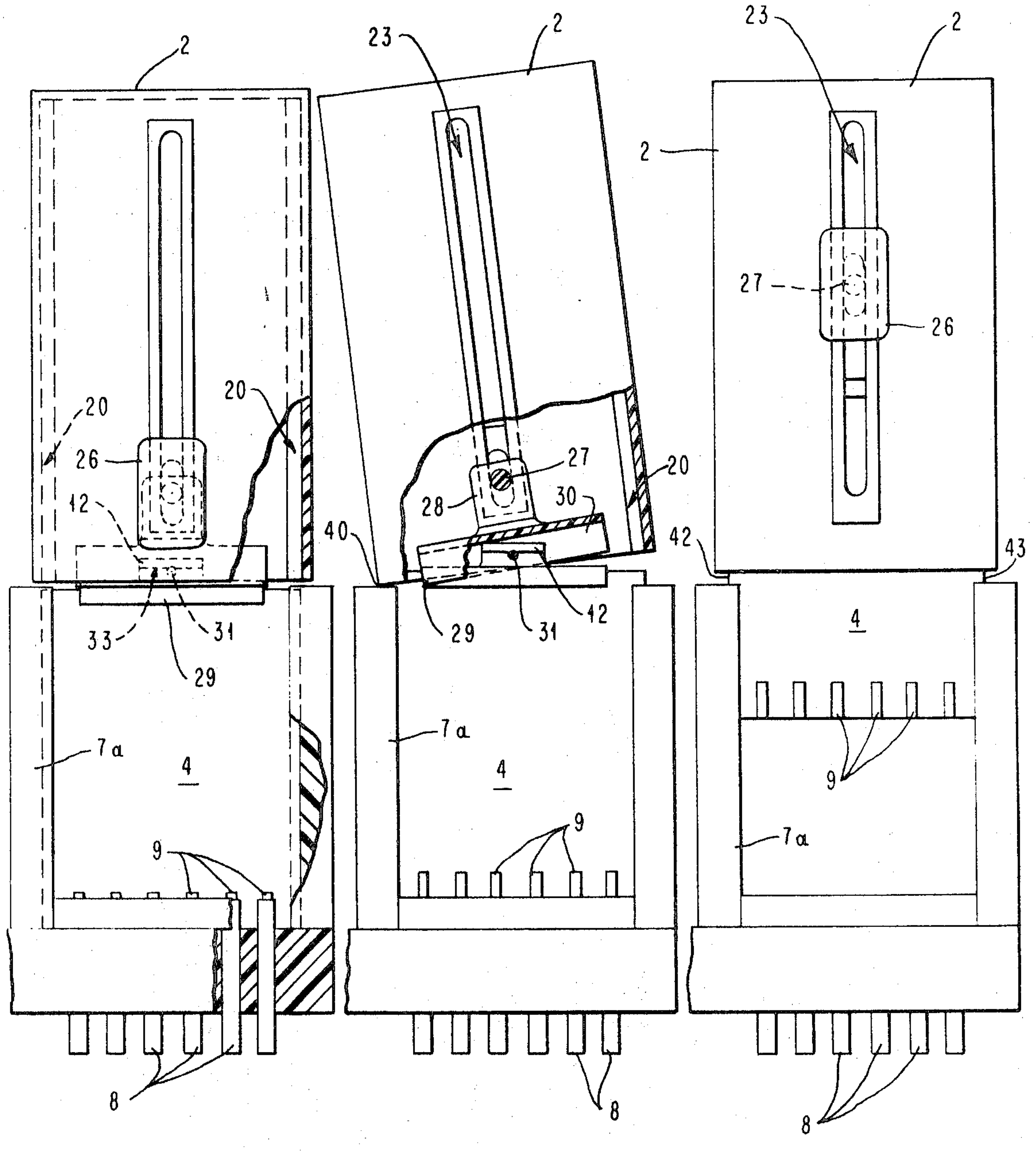
FIGS. 3–5 are progressive front views of an integral case tool device and assembly of modules illustrating successive manipulations of the device in the process of uncoupling a module from a plug-in connection and transferring the module into the storage compartment of the case.

The case element is now rocked or pivoted relative to column 7*a* of the equipment frame 7 by manual manipulation (FIG. 4). This produces an upward force upon the stud 12 through pins 31, 32, displacing the card upwardly a small distance sufficient to release the card from its plug-in engagement to connectors 8 in main frame 7. Forces on the order of 7 pounds may be required for circuit cards of indicated dimensions.

After loosening the hold of the frame connectors upon the card and with the card now slightly displaced above its initial position (about 80 mils in the illustrated configuration) case 2 is rocked back into alignment with the card 4. Now with the case held in one hand the manipulator grasps knobs 26 with fingers of the other hand and pulls the knobs upward along the grooves 23 thereby carrying linking member 28 and the engaged card 4 into the interior compartment space of the case (FIG. 5). Edges 42, 43 of the card are carried into the guide channels 20 in the case guiding the card into the home storage position with sufficient clearance between the case and the card sub-structures 10 (FIG. 1) to ensure that the sub-structures are not contacted.

With the card securely positioned in the home position the cover 5 (FIG. 2) is affixed to the case and the card may now be transported within the case fully protected from potentially destructive contact. If desired cards may even be shipped as enclosed in case-tool units such as 1; for example to a repair station remote from an electronic equipment frame 7 from which the card has been extracted.

In order to assure secure retention of the card in the home position while opening 3 of the case element is uncovered, it is desirable to incorporate a retention feature as described next. One such feature seen in FIGS. 2 and 6 consists of embossed longitudinally tapered ridges 50 in the outer surface of case 2 adjacent grooves 23. These ridges taper outwardly from an end 51 nearest opening 3 toward an opposite end 52 nearest the home storage position of knobs 26. Consequently as the knobs are translated towards home position (FIG. 5) contact is gradually established between knob surfaces 55 and respective surfaces of ridges 50. By suitable dimensioning of the ridge taper this contact is sufficient in the knob home position to positively retain the knob, actuator assembly and card in the home position. Clearly without such retention the knob, assembly and card would be free, if accidentally released by the manipulator, to slide away from the home position towards the opening 3 which if uncovered would allow the captivating stud of the card to slip off the pins 31, 32 and the card to drop out of the case.

Figure 7:
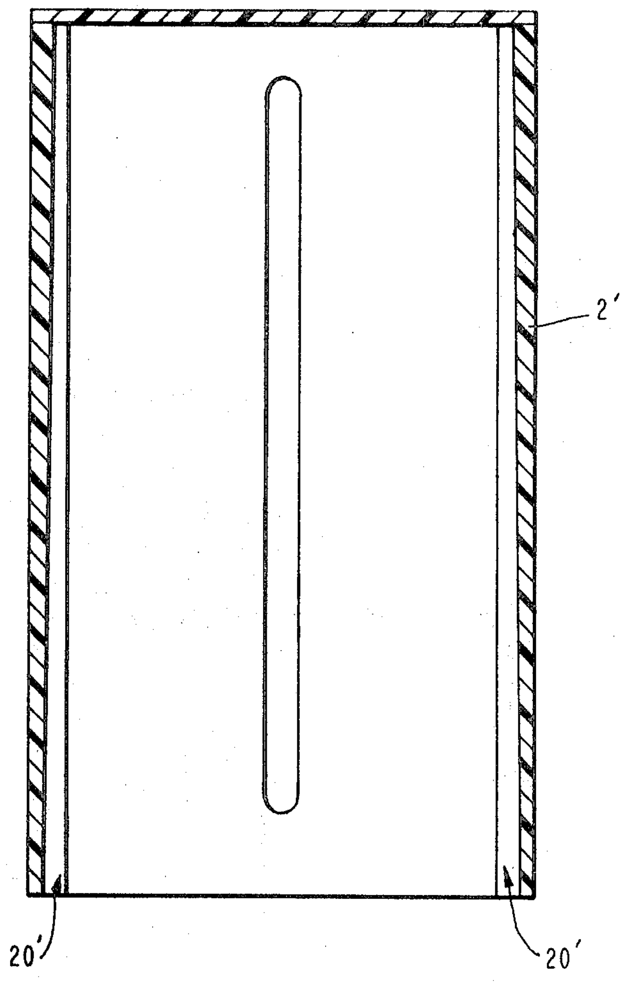
FIG. 7 is a front sectional view of the integral case device illustrating an alternate embodiment of the retention feature by which accidental release of a stored module is averted.

An alternative retention feature is shown in FIG. 7. Here the guide channels 20' in case 2' have been tapered in width to provide a decreasing space towards the home position whereby the edges 42, 43 of the card (FIG. 5) are contacted in the home position to restrict sliding freedom of both the card and actuator assembly.

Figure 8:
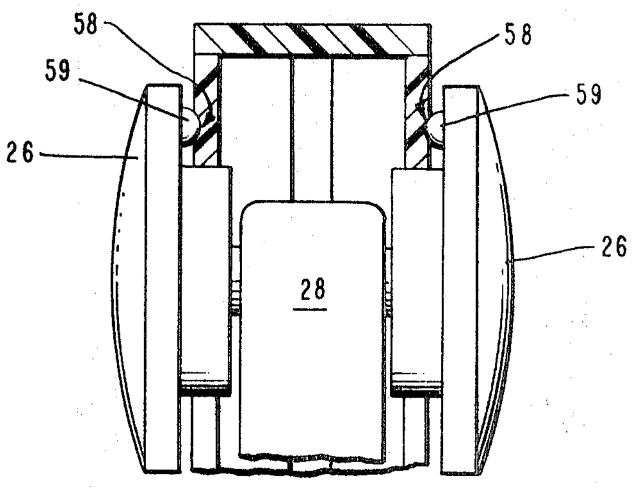
FIG. 8 is a side sectional view of the said device illustrating a third embodiment of the said retention feature.

A third alternative retention expedient suggested in FIG. 8 consists of detents 58 in the outer surfaces of case 2 at the home position end which mesh snugly with projections 59 on under surfaces of the knobs 26. The detents and projections may also be reversed so that the detents are in the knobs and the projections are formed on the case.

The system and method of utilization of multiple case members 2 may now be appreciated. Circuit cards are transported to or away from an equipment frame protectively enclosed in separate case-tool devices 1. Circuit cards may be extracted from a frame by the case-tool manipulation previously described or they may be plugged into frame connections by manipulation in the reverse sense to force linkage 28 against the uppermost edge of the card captivating stud 12 and thereby urge the card into the plug-in engagement.

Being simple and economical in construction plural case assemblies 2, 28, 26 can be provided for each equipment frame installation and/or for each inventory spare part facility.

Cards enclosed in case-tools 1 may be merely wrapped in paper cartons and safely shipped by ordinary mail from field equipment frame installations to remote repair stations. Conversely, replacement cards may be stored in remote inventory facilities and shipped to field frame installations in such case-tools.

The case-tool design is especially compatible for use with densely-packed frame assemblies of cards since minimal maneuvering space is required to couple pins 31, 32 to a card stud 12. It will be understood further that the illustrated stud design can be varied extensively and yet serve the intended purpose. Thus for example we consider it within the scope and context of our invention to provide engagement channels for the pins 31, 32 directly within the card when the material construction of the card admits of such.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. An integral device useful as a storage container and manipulative tool for handling extraction, storage and insertion of plug-in type electronic circuit modules, while isolating delicate sub-structures on each stored module from physical contact to which the same otherwise would be susceptible in consequence of such handling comprising:

means forming a protective enclosure for securely retaining and housing a said module in a position of storage in which said delicate sub-structures of said module are isolated from physical contact; said means having an opening for receiving and dispensing a module;

means tranlatably secured to said enclosure forming means and forming therewith a plural pivot linkage manipulatively operative without physical contact with said module sub-structures to:

a. maneuver a said module between said position of storage and an external position of loose abutment in which terminal elements of the module are situated adjacent corresponding connector elements of an electronic assembly of modules; and b. forcibly maneuver a said module between a said position of loose abutment and a position of tight fitting plug-in engagement relative to said assembly connector elements.

2. A container and manipulative device according to claim 1 wherein said enclosure forming means includes a longitudinal slot and said translatably secured means is slidably retained in said slot.

3. A device according to claim 2 wherein said enclosure forming means includes means for impeding sliding of said translatably secured means in said slot as a said circuit module is maneuvered into said storage position.

4. A device according to claim 3 wherein said enclosure forming means has a longitudinal retention embossment adjacent to the outer surface of said slot, said embossment having an outward taper in the longitudinal direction by which it presents increasing sliding impedance to said translatably secured means as the latter is drawn along the slot away from the opening in said enclosure forming means.

5. A device according to claim 3 wherein said enclosure forming means contains internal guide channels for slidably receiving and longitudinally guiding side edges of a card module; said guide channels having a longitudinally tapered construction forming said sliding impeding means, said construction tpaering gradually from a loose fit about said module edges to a snug fit as said module is drawn through said opening into the closure space formed by said closure forming means.

6. A device according to claim 3 wherein said sliding impeding means comprises a detent in said enclosure forming means and a counterpart projection on said translatably secured means.

7. An integral "hands-off" circuit card extractor-storage unit-inserter for circuit cards having an engageable head section and fragile body section comprising:

a case having a transverse card receiving/dispensing opening, a removable cover for said opening and a longitudinal slot;

a card transport member slidably disposed in said slot; said member having a manually graspable element extending outwardly of said slot; said member having an actuator element pivotally secured to said grasping element and extending inwardly of said slot; said actuator element including means for pivotally engaging a said head section of a circuit card;

said case and transport member being adapted for pivotal and linear displacement relative to each other to secure forcible extraction of a said engaged circuit card relative to a plug-in connection in an electronic system assembly of mated cards and connectors;

said transport member and case being further adapted for further relative pivotal and translational displacement in order to translate a said engaged card between a home storage position in said case and a said plug-in connection in an electronic assembly while maintaining protective isolation of said card body section relative to said case;

said case including retention means for securing retention of said transport member and engaged card in said home storage position in order to prevent accidental ejection of said card from said case whilst said opening is uncovered.

8. An integral circuit card extractor-storage unit-inserter according to claim 7 wherein said retention means includes a longitudinally tapered embossment adjacent said slot adapted to engage and thereby restrain said transport member.

9. An integral circuit card extractor-storage unit-inserter according to claim 7 wherein said retention means comprises a detent in said case interactive with a corresponding projection of said transport member in said home storage position thereof.

10. An integral circuit card extractor-storage unit-inserter according to claim 7 wherein said retention means comprises a detent in said transport member interactive in said home position with a corresponding projection of said case.

11. An integral circuit card extractor-storage unit-inserter according to claim 7 wherein said retention means comprises a longitudinally tapered construction along interior edges of said channel adapted to closely fit corresponding edges of a said card in said home position.

12. An integral circuit card extractor-storage unit-inserter according to claim 7 wherein said translational adaptation of said case includes longitudinal guide channel constructions along interior edges of said case, said channels serving as guide rails for edges of a said engaged card by which said body section of the same card is transported in protected isolation relative to said case.

13. An extraction and protective handling system for plug-in circuit modules comprising:

an element adapted for pivotal engagement integral with each module and situated along an upper edge thereof remote from the respective connection elements by which plug-in connection is made;

a case member containing a said circuit module storage compartment, an opening for inserting a module into said compartment, internal guide channels for guiding a said inserted module into said compartment with sensitive surface areas of said module isolated from contact and a cover for said opening; and an actuator mechanism linked to said case member; said mechanism including:

means for pivotally engaging an engagement element of a said module;

means linked to said last mentioned means and said case for forcibly releasing a module from a plug-in connection in an electronic equipment frame by manipulation of said case relative to said frame; and means for displacing the said actuator mechanism and module as an assembly relative to said compartment to secure "hands-off" storage of a said released module nested in and protectively guided by said channels in said case member.

14. A system according to claim 13 wherein said actuator mechanism is operated to effect extraction and protective storage of a said module by a series of discrete pivotal movements of said case member relative to the said equipment frame; said pivotal movements including a first movement to effect forcible release of said module from said plug-in connection and a second movement to align said case guide channels with edges of said released module.

* * * * *